(12) United States Patent
Stamm et al.

(10) Patent No.: US 6,546,037 B2
(45) Date of Patent: Apr. 8, 2003

(54) MOLECULAR FLUORINE LASER WITH SPECTRAL LINEWIDTH OF LESS THAN 1 PM

(75) Inventors: Uwe Stamm, Goettingen (DE); Sergei V. Govorkov, Boca Raton, FL (US)

(73) Assignee: Lambda Physik AG, Goettingen (DE)

(*) Notice: Subject to any disclaimer, the term of this patent is extended or adjusted under 35 U.S.C. 154(b) by 0 days.

(21) Appl. No.: 10/077,328

(22) Filed: Feb. 15, 2002

(65) Prior Publication Data

US 2002/0075933 A1 Jun. 20, 2002

Related U.S. Application Data

(63) Continuation of application No. 09/599,130, filed on Jun. 22, 2000, and a continuation-in-part of application No. 09/317,527, filed on May 24, 1999, now Pat. No. 6,154,470
(60) Provisional application No. 60/204,095, filed on May 15, 2000, provisional application No. 60/170,342, filed on Dec. 13, 1999, provisional application No. 60/166,967, filed on Nov. 23, 1999, provisional application No. 60/162,735, filed on Oct. 29, 1999, provisional application No. 60/140,531, filed on Jun. 23, 1999, provisional application No. 60/130,392, filed on Apr. 19, 1999, provisional application No. 60/120,218, filed on Feb. 12, 1999, and provisional application No. 60/119,486, filed on Feb. 10, 1999.

(51) Int. Cl.[7] ................................................. H01S 3/22
(52) U.S. Cl. ............................ 372/57; 372/59; 372/98; 372/25; 372/103; 372/700
(58) Field of Search .............................. 372/57–59, 25, 372/98, 103, 700

(56) References Cited

U.S. PATENT DOCUMENTS

| | | | | |
|---|---|---|---|---|
| 3,471,800 A | 10/1969 | Congleton et al. | .......... | 331/94.5 |
| 3,546,622 A | 12/1970 | Peterson et al. | .......... | 331/94.5 |
| 3,609,586 A | 9/1971 | Hans et al. | .......... | 331/94.5 |

(List continued on next page.)

FOREIGN PATENT DOCUMENTS

| | | | | |
|---|---|---|---|---|
| DE | 40 15 861 A1 | 11/1991 | ........... | H01S/3/225 |
| DE | 298 22 090 U 1 | 3/1999 | ........... | H01S/3/225 |
| EP | 0 820 132 A2 | 1/1998 | ......... | H01S/3/0975 |
| EP | 1 041 689 A1 | 10/2000 | ......... | H01S/3/1055 |
| EP | 1 102 368 A2 | 5/2001 | ........... | H01S/3/081 |
| EP | 1 119 083 A2 | 7/2001 | ............. | H01S/3/08 |

OTHER PUBLICATIONS

Kung, A.H., Physical Review Letters, 1972, vol. 29, pp. 985.

Kung et al., "Generation of 1182–Å Radiation in Phase–Matched Mixtures of Inert Gases," *Applied Physics Letters*, Mar. 15, 1973, vol. 22., No. 6, pp. 301–302.

(List continued on next page.)

*Primary Examiner*—Leon Scott, Jr.
(74) *Attorney, Agent, or Firm*—Sierra Patent Group, Ltd.; Andrew V. Smith

(57) ABSTRACT

A narrow band molecular fluorine laser system includes an oscillator and an amplifier, wherein the oscillator produces a 157 nm beam having a linewidth less than 1 pm and the amplifier increases the power of the beam above a predetermined amount, such as more than one or several Watts. The oscillator includes a discharge chamber filled with a laser gas including molecular fluorine and a buffer gas, electrodes within the discharge chamber connected to a discharge circuit for energizing the molecular fluorine, and a resonator including the discharge chamber for generating a laser beam having a wavelength around 157 nm. Line-narrowing optics are included intra- and/or extra-resonator for reducing the linewidth of the laser beam to less than 1 pm. The amplifier may be the same or a different discharge chamber, and optical and/or electronic delays may be used for timing pulses from the oscillator to reach the amplifier at a maximum in the discharge current of the amplifier.

8 Claims, 8 Drawing Sheets

U.S. PATENT DOCUMENTS

| | | | |
|---|---|---|---|
| 4,393,505 A | 7/1983 | Fahlen | 372/57 |
| 4,616,908 A | 10/1986 | King | 350/576 |
| 4,691,322 A | 9/1987 | Nozue et al. | 372/82 |
| 4,829,536 A | 5/1989 | Kajiyama et al. | 372/57 |
| 4,856,018 A | 8/1989 | Nozue et al. | 372/98 |
| 4,860,300 A | 8/1989 | Bauemler et al. | 372/57 |
| 4,881,231 A | 11/1989 | Jain | 372/32 |
| 4,905,243 A | 2/1990 | Lokai et al. | 372/32 |
| 4,926,428 A | 5/1990 | Kajiyama et al. | 372/20 |
| 4,975,919 A | 12/1990 | Amada et al. | 372/33 |
| 4,977,573 A | 12/1990 | Bittenson et al. | 372/81 |
| 4,985,898 A | 1/1991 | Furuya et al. | 372/106 |
| 5,025,445 A | 6/1991 | Anderson et al. | 372/20 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,161,238 A | 11/1992 | Mehmke | 359/738 |
| 5,221,823 A | 6/1993 | Usui | 219/121.78 |
| 5,255,282 A | 10/1993 | Remo | 372/82 |
| 5,337,330 A | 8/1994 | Larson | 372/86 |
| 5,396,514 A | 3/1995 | Voss | 372/57 |
| 5,404,366 A | 4/1995 | Wakabayashi et al. | 372/29 |
| 5,440,574 A | 8/1995 | Sobottke et al. | 372/34 |
| 5,450,207 A | 9/1995 | Fomenkov | 356/416 |
| 5,479,431 A | 12/1995 | Sobottke et al. | 372/92 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,596 A | 1/1997 | Wakabayashi et al. | 372/102 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,748,346 A | 5/1998 | David et al. | 359/15 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,949,806 A | 9/1999 | Ness et al. | 372/38 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,002,697 A | 12/1999 | Govorkov et al. | 372/34 |
| 6,005,880 A | 12/1999 | Basting et al. | 372/38 |
| 6,014,206 A | 1/2000 | Basting et al. | 356/138 |
| 6,018,537 A | 1/2000 | Hoffmann et al. | 372/25 |
| 6,020,537 A | 2/2000 | Desor et al. | 320/166 |
| 6,028,872 A | 2/2000 | Partlo et al. | 372/38 |
| 6,028,879 A | 2/2000 | Ershov | 372/57 |
| 6,101,211 A | 8/2000 | Wakabayashi et al. | 372/20 |
| 6,137,821 A | 10/2000 | Ershov | 372/19 |
| 6,154,470 A * | 11/2000 | Bastingf et al. | 372/19 |
| 6,240,110 B1 | 5/2001 | Ershov | 372/20 |
| 6,381,256 B1 * | 4/2002 | Stamm et al. | 372/19 |
| 6,426,666 B1 * | 7/2002 | Stamm | 372/32 |
| 6,463,086 B1 * | 10/2002 | Stamm et al. | 372/20 |
| 6,490,306 B2 * | 12/2002 | Stamm et al. | 372/57 |
| 2002/0186741 A1 * | 12/2002 | Kleinschmidt et al. | 372/47 |

OTHER PUBLICATIONS

Marcus, S., "Cavity Dumping and Coupling Modulation of an Etalon–coupled CO2 Laser a)," *Journal of Applied Physics* Sep. 1982, vol. 53, No. 9, pp. 6029–6031.

Mueckenheim, W., "Seven Ways to Combine Two Excimer Lasers," *Laser Focus/Electro–Optics*, Jul. 1987.

Mueckenheim, W., et al., "Excimer Laser with Narrow Linewidth and Large Internal Beam Divergence," *Journal of Physics E: Scientific Instruments* Nov. 1987; vol. 20, pp. 1394–1396.

Ishihara et al., "Theoretical Modeling of Microwave–Pumped High–Pressure Gas Lasers," *Applied Physics B*, 1989, vol. B 48., pp. 315–326.

Hall, D.R., "The Physics and Technology of Laser Resonators," 1989.

Christensen, C.H., "Compact, Self–Contained ArF Lasers," *Performing Organization Report Number AFOSR IR 95–0370*, Jun. 1, 1991.

Kakehata et al., "Gain and Saturation Intensity Measurements of a Discharge Pumped F2 Laser at High Excitation Rates," *Applied Physics Letters* Dec. 28, 1992, vol. 61, No. 26, pp. 3089–3091.

Gruenefeld et al., "Operation of KrF and ArF Tunable Excimer Laser without Cassegrain Optics," *Applied Physics* Mar. 1996, vol. B 62, No. 3, pp. 241–247.

Bondelie, K., "Sealed Carbon Dioxide Lasers Achieve New Power Levels," *Laser Focus World*, Aug. 1996, pp. 95–100.

Lengfellner, H., "Generation of Tunable Pulsed Microwave Radiation by Nonlinear Interaction of Nd:YAG Laser Radiation in GaP Crystals," *Optics Letters* Mar. 1997, vol. 12, No. 3, pp. 184–186.

Bloomstein et al., "Critical Issues in 157 nm Lithography," *J. Vac. Sci. Technol. B: MicroElectronics and Nanometer Structures* Nov./Dec. 1998, vol. 16, No. 6, pp. 3154–3157.

Stamm, U., "Status of 157 nm Excimer Laser," *International SEMATECH 157 nm Workshop*, Feb. 15–17, 1999, Litchfield, AZ, USA.

Hoffman et al., "Prospects of High Repetition Rate F2(157 nm) Laser for Microlithography," *International SEMATECH 157 nm Workshop*, Feb. 15–17, 1999.

Stamm, U., et al., "Excimer Laser for 157 nm Lithography," *Part of the SPIE Conference on Emerging Lithographic Technologies III*, Santa Clara, CA Mar. 1999, pp. 816–826.

Hoffman et al., "Revisiting F2 Laser for DUV Microlithography," *Proceedings of SPIE: Optical Microlithography XII* Mar. 17–19, 1999; vol. 3679, pp. 541–546.

* cited by examiner

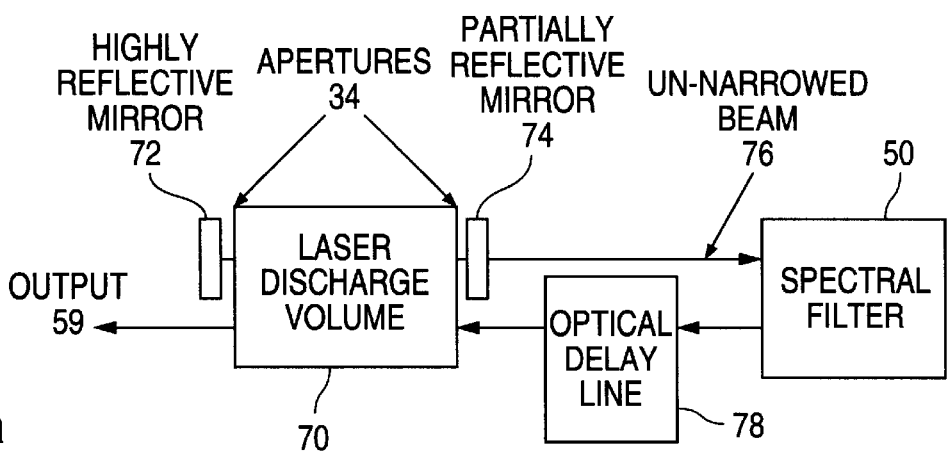
FIG. 4a
FIG. 4b(i)
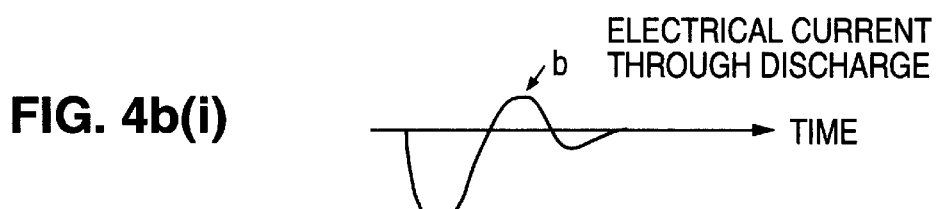
FIG. 4b(ii)
FIG. 4b(iii)
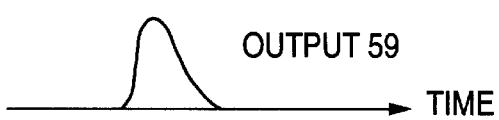
FIG. 5a
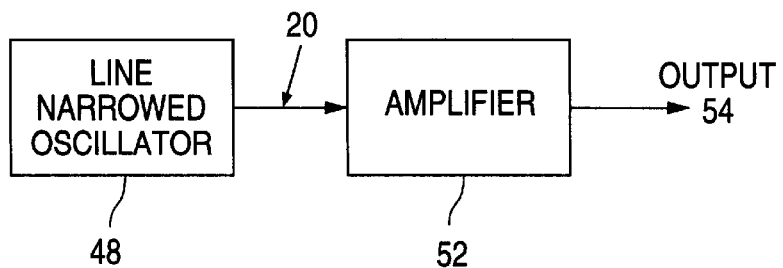

MOLECULAR FLUORINE LASER WITH SPECTRAL LINEWIDTH OF LESS THAN 1 PM

This application claims is a rule 1.53(b) continuation application which claims the benefit of priority to U.S. patent application Ser. No. 09/599,130, filed Jun. 22, 2000, which claims the benefit of priority to U.S. provisional patent application Nos. 60/140,531, filed Jun. 23, 1999, 60/204,095, filed May 15, 2000, 60/162,735, filed Oct. 29, 1999, 60/166,967, filed Nov. 23, 1999 and 60/170,342, filed Dec. 13, 1999, and which is also a Continuation-in-Part application claiming the benefit of priority to U.S. patent application Ser. No. 09/317,527, filed May 24, 1999, now U.S. Pat. No. 6,154,470, which claims the benefit of priority to U.S. provisional patent application Nos. 60/120,218, filed Feb. 12, 1999, 60/119,486, flied Feb. 10, 1999, and 60/130,392, filed Apr. 19, 1999. All of the above priority applications are hereby incorporated by reference into the present application.

BACKGROUND OF INVENTION

1. Field of the Invention

The present invention relates to a molecular fluorine laser system including line-narrowing elements and method for generating a VUV laser beam having a spectral linewidth of less than substantially 1 pm.

2. Description of the Related Art

Vacuum-UV microlithography takes advantage of the short wavelength of the molecular fluorine laser (157.6 nm), which allows the formation of structures of 0.1 $\mu$m or below by photolithographic exposure on semiconductor substrates. TFT annealing and micro-machining applications may also be performed advantageously at this wavelength.

Given the limited choice of high quality optical materials available in this wavelength range for manufacturing imaging lenses, requirements of minimal chromatic aberrations restrict spectral linewidths of the laser source for refractive and partially achromatic imaging systems to below 1 pm. The expectation is that spectral linewidths be between 0.1 pm and 0.2 pm, and perhaps even below 0.1 pm in the future. Conventional molecular fluorine lasers emit VUV beams having spectral linewidths of greater than 1 pm.

A disadvantage of narrowing of spectral linewidth in a laser is that it commonly leads to a significant decrease of efficiency and output power. Therefore, it is recognized in the present invention that to achieve a desired high throughput for 157 nm wafer steppers or wafer scanners, it would be advantageous to have a line-narrowed molecular fluorine laser emitting an output beam of less than 1 pm, with a high output power that averages anywhere from several watts to more than 10 watts.

SUMMARY OF THE INVENTION

It is therefore a first object of the present invention to provide a VUV laser system having a narrow linewidth, i.e., less than substantially 1 pm for producing small structures on silicon wafers.

It is a second object of the invention to provide a VUV laser having a linewidth of 1 pm or less which exhibits sufficient output power, i.e., at least several Watts, to allow high throughput for VUV lithography applications at 157 nm.

Methods and apparatuses are provided in accord with the above objects, such as a narrow band molecular fluorine laser system including an oscillator and an amplifier, wherein the oscillator produces a 157 nm beam having a linewidth less than 1 pm and the amplifier increases the power of the beam above a predetermined amount, such as more than one or several Watts. The oscillator includes a discharge chamber filled with a laser gas including molecular fluorine and a buffer gas, electrodes within the discharge chamber connected to a discharge circuit for energizing the molecular fluorine, and a resonator including the discharge chamber and line-narrowing optics for generating the laser beam having a wavelength around 157 nm and a linewidth less than 1 pm.

The amplifier preferably comprises a discharge chamber filled with a laser gas including molecular fluorine and a buffer gas, electrodes connected to the same or a similar discharge circuit, e.g., using an electrical delay circuit, for energizing the molecular fluorine. The amplifier discharge is timed to be at or near a maximum in discharge current when the pulse from the oscillator reaches the amplifier discharge chamber.

The line-narrowing optics preferably include one or more etalons tuned for maximum transmissivity of a selected portion of the spectral distribution of the beam, and for relatively low transmissivity of outer portions of the spectral distribution of the beam. A prism beam expander is preferably provided before the etalons for expanding the beam incident on the etalon or etalons. Two etalons may be used and tuned such that only a single interference order is selected.

The line-narrowing optics may further include a grating for selecting a single interference order of the etalon or etalons corresponding to the selected portion of the spectral distribution of the beam. The resonator further preferably includes an aperture within the resonator, and particularly between the discharge chamber and the beam expander. A second aperture may be provided on the other side of the discharge chamber.

The line-narrowing optics may include no etalon. For example, the line optics may instead include only a beam expander and a diffraction grating. The beam expander preferably includes two, three or four VUV transparent prisms before the grating. The grating preferably has a highly reflective surface for serving as a resonator reflector in addition to its role of dispersing the beam.

The line-narrowing optics may include an etalon output coupler tuned for maximum reflectivity of a selected portion of the spectral distribution of the beam, and for relatively low reflectivity of outer portions of the spectral distribution of the beam. This system would also include optics such as a grating, dispersive prism or etalon, preferably following a beam expander, for selecting a single interference order of the etalon output coupler. The resonator would preferably have one or more apertures for reducing stray light and divergence within the resonator.

In any of above configurations including a grating, a highly reflective mirror may be disposed after the grating such that the grating and HR mirror form a Littman configuration. Alternatively, the grating may serve to retroreflect as well as to dispserse the beam in a Littrow configuration. A transmission grating or grism may also be used.

The buffer gas preferably includes neon and/or helium for pressurizing the gas mixture sufficiently to increase the output energy for a given input energy and to increase the energy stability, gas and tube lifetime, and/or pulse duration. The laser system further preferably includes a gas supply system for transferring molecular fluorine into discharge chamber and thereby replenishing the molecular fluorine, therein, and a processor cooperating with the gas supply system to control the molecular fluorine concentration within the discharge chamber to maintain the molecular fluorine concentration within a predetermined range of optimum performance of the laser.

The laser system may also include a spectral filter between the oscillator and the amplifier for further narrowing the linewidth of the output beam of the oscillator. The spectral filter may include an etalon or etalons following a beam expander. Alternatively, the spectral filter may include a grating for dispersing and narrowing the beam. In the grating embodiment, the spectral filter may include a lens focusing the beam through a slit and onto a collimating optic prior to impinging upon the beam expander-grating combination.

BRIEF DESCRIPTION OF THE DRAWINGS

FIG. 4a schematically shows an alternative embodiment in accord with the second aspect of the invention including a single discharge chamber providing the gain medium for both an oscillator and an amplifier, and having a spectral filter in between.

FIGS. 4b(i)–(iii) respectively show waveforms of the electrical discharge current, un-narrowed beam intensity and output beam intensity in accord with the alternative embodiment of FIG. 3a.

FIG. 5a schematically shows a preferred embodiment in accord with a third aspect of the invention including a line-narrowed oscillator followed by a power amplifier.

INCORPORATION BY REFERENCE

What follows is a cite list of references each of which is, in addition to those references cited above in the priority section, hereby incorporated by reference into the detailed description of the preferred embodiment below, as disclosing alternative embodiments of elements or features of the preferred embodiments. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

1—U. Stamm, "Status of 157 nm The 157 Excimer Laser" International SEMATECH 157 nm Workshop, Feb. 15–17, 1999, Litchfield, Ariz., USA;

2—T. Hofman, J. M. Hueber, P. Das, S. Scholler, "Prospects of High Repetition Rate $F_2$ (157 nm) Laser for Microlithography", International SEMATECH 157 Workshop, Feb. 15–17, 1999, Litchfield, Ariz., USA;

3—U. Stamm, I. Bragin, S. Govorkov, J. Kleinschmidt, R. Patzel, E. Slobodtchikov, K. Vogler, F. Voss, and D. Basting, "Excimer Laser for 157 nm Lithography", $24^{th}$ International Symposium on Microlithography, Mar. 14–19, 1999, Santa Clara, Calif., USA;

4—T. Hofmann, J. M. Hueber, P. Das, S. Scholler, "Revisiting The $F_2$ Laser For DUV microlithography", $24^{th}$ International Symposium on Microlithography, Mar. 14–19, 1999, Santa Clara, Calif., USA.

5—W. Muckenheim, B. Ruckle, "Excimer Laser with Narrow Linewidth and Large Internal Beam Divergence", J. Phys. E: Sci. Instrum. 20 (1987) 1394;

6—G. Grunefeld, H. Schluter, P. Andersen, E. W. Rothe, "Operation of KrF and ArF Tunable Excimer Lasers Without Cassegrain Optics", Applied Physics B 62 (1996) 241;

7—U.S. patent applications Ser. Nos. 09/317,526, 09/343,333, Nos. 60/122,145, 60/140,531, 60/162,735, 60/166,952, 60/171,172, 60/141,678, 60/173,993, 60/166,967, 60/172,674, and 60/181,156, and U.S. patent application of Kleinschmidt, serial number not yet assigned, filed May 18, 2000, for "Reduction of Laser Speckle in Photolithography by Controlled Disruption of Spatial Coherence of Laser Beam," and U.S. Pat. No. 6,005,880, each of which is assigned to the same assignee as the present application; and 8—W. Mueckenheim, "Seven Ways to Combine Two Excimer Lasers," reprinted from July 1987 edition of Laser Focus/Electro-Optics.

DETAILED DESCRIPTION OF THE PREFERRED EMBODIMENTS

Figure 1:
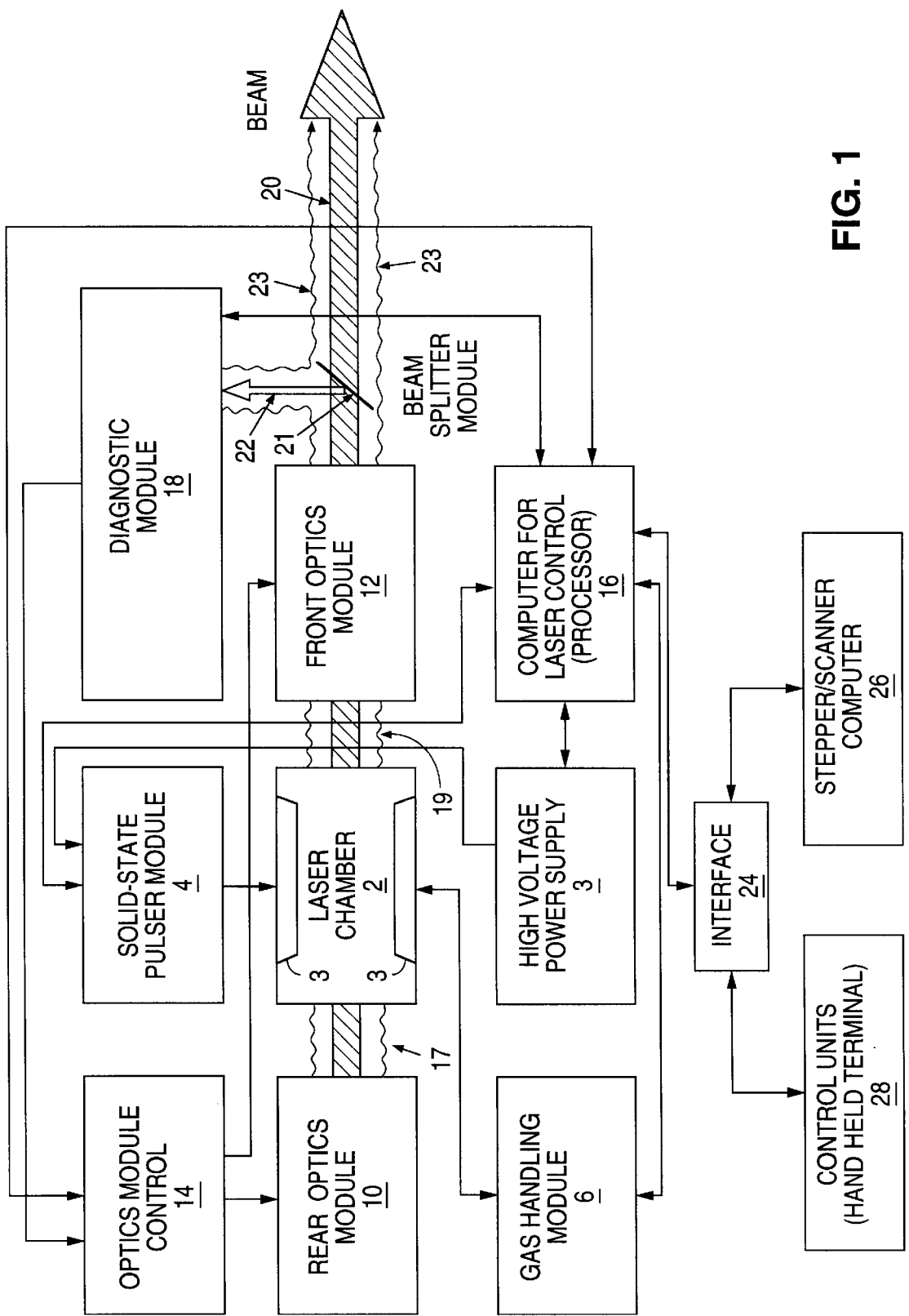
FIG. 1 schematically illustrates a molecular fluorine laser system in accord with a preferred embodiment.

Referring to FIG. 1, a VUV laser system, preferably a molecular fluorine laser for deep ultraviolet (DUV) or vacuum ultraviolet (VUV) lithography, is schematically shown. Alternative configurations for laser systems for use in such other industrial applications as TFT annealing and/or micromachining, e.g., are understood by one skilled in the art as being similar to and/or modified from the system shown in FIG. 1 to meet the requirements of that application. For this purpose, alternative VUV laser system and component configurations are described at U.S. patent application Ser Nos. 09/317,695, 09/317,526, 09/317,527, 09/343,333, Nos. 60/122,145, 60/140,531, 60/162,735, 60/166,952, 60/171,172, 60/141,678, 60/173,993, 60/166,967, 60/172,674, and 60/181,156, and U.S. patent application of Kleinschmidt, serial number not yet assigned, filed May 18, 2000, for "Reduction of Laser Speckle in Photolithography by Controlled Disruption of Spatial Coherence of Laser Beam," and U.S. Pat. No. 6,005,880, each of which is assigned to the same assignee as the present application and is hereby incorporated by reference.

The system shown in FIG. 1 generally includes a laser chamber 2 having a pair or several pairs of main discharge electrodes 3 connected with a solid-state pulser module 4, and a gas handling module 6. The solid-state pulser module 4 is powered by a high voltage power supply 8. The laser chamber 2 is surrounded by optics module 10 and optics module 12, forming a resonator. The optics modules 10 and 12 are controlled by an optics control module 14.

A computer 16 for laser control receives various inputs and controls various operating parameters of the system. A diagnostic module 18 receives and measures various parameters of a split off portion of the main beam 20 via optics for deflecting a small portion of the beam toward the module 18, such as preferably a beam splitter module 21, as shown. The beam 20 is preferably the laser output to an imaging system (not shown) and ultimately to a workpiece (also not shown). The laser control computer 16 communicates through an interface 24 with a stepper/scanner computer 26 and other control units 28.

The laser chamber 2 contains a laser gas mixture and includes a pair of or several pairs of main discharge electrodes 3 and one or more preionization electrodes (not shown). Preferred main electrodes 3 are described at U.S. patent application Ser. No. 09/453,670, Nos. 60/184,705 and 60/128,227, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. The laser chamber 2 also includes a preionization arrangement (not shown). Preferred preionization units are set forth at U.S. patent applications Nos. 60/162,845, 60/160,182, 60/127,237, Ser. Nos. 09/535,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state pulser module 14 and high voltage power supply 8 supply electrical energy in compressed electrical pulses to the preionization and main electrodes 3 within the laser chamber 2 to energize the gas mixture. The preferred pulser module and high voltage power supply are described at U.S. patent applications Nos. 60/149,392, 60/198,058, and Ser. No. 09/390,146, and U.S. patent application of Osmanow, et al., serial number not yet assigned, filed May 15, 2000, for "Electrical Excitation Circuit for Pulsed Laser", and U.S. Pat. Nos. 6,005,880 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 3 Joules of electrical power (see the '988 patent, mentioned above).

The laser resonator which surrounds the laser chamber 2 containing the laser gas mixture includes optics module 10 including line-narrowing optics for a line narrowed excimer or molecular fluorine laser, which may be replaced by a high reflectivity mirror or the like in a laser system wherein either line-narrowing is not desired, or if line narrowing is performed at the front optics module 12, or an spectral filter external to the resonator is used for narrowing the linewidth of the output beam. Several variations of line-narrowing optics are set forth in detail below.

The laser chamber 2 is sealed by windows transparent to the wavelengths of the emitted laser radiation 14. The windows may be Brewster windows or may be aligned at another angle to the optical path of the resonating beam. The beam path between the laser chamber and each of the optics modules 10 and 12 is sealed by enclosures 17 and 19, and the interiors of the enclosures is substantially free of water vapor, oxygen, hydrocarbons, fluorocarbons and the like which otherwise strongly absorb VUV laser radiation.

After a portion of the output beam 20 passes the outcoupler of the optics module 12, that output portion impinges upon beam splitter module 21 which includes optics for deflecting a portion of the beam to the diagnostic module 18, or otherwise allowing a small portion of the outcoupled beam to reach the diagnostic module 18, while a main beam portion 20 is allowed to continue as the output beam 20 of the laser system. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 18. A holographic beam sampler, transmission grating, partially transmissive reflection diffraction grating, grism, prism or other refractive, dispersive and/or transmissive optic or optics may also be used to separate a small beam portion 22 from the main beam 20 for detection at the diagnostic module 18, while allowing most of the main beam 20 to reach an application process directly or via an imaging system or otherwise. The output beam 20 may be transmitted at the beam splitter module while a reflected beam portion 22 is directed at the diagnostic module 18, or the main beam 20 may be reflected, while a small portion 22 is transmitted to the diagnostic module 18. The portion of the outcoupled beam which continues past the beam splitter module 21 is the output beam 20 of the laser, which propagates toward an industrial or experimental application such as an imaging system and workpiece for photolithographic applications.

An enclosure 23 seals the beam path of the beams 22 and 20 such as to keep the beam paths free of photoabsorbing species. Smaller enclosures 17 and 19 seal the beam path between the chamber 2 and the optics modules 10 and 12. The preferred enclosure 23 and beam splitting module 21 are described in detail in the Ser. No. 09/343,333 and No. 60/140,530 applications, incorporated by reference above, and in U.S. patent application Ser. No. 09/131,580, which is assigned to the same assignee and U.S. Pat. Nos. 5,559,584, 5,221,823, 5,763,855, 5,811,753 and 4,616,908, all of which are hereby incorporated by reference. For example, the beam splitting module 21 preferably also includes optics for filtering visible red light from the beam 22 so that substantially only VUV light is received at a detector of the diagnostic module 18. Filtering optics may also be included for filtering red light from the output beam 20. Also, an inert gas purge is preferably flowing through the enclosure 23.

The diagnostic module 18 preferably includes at least one energy detector. This detector measures the total energy of the beam portion that corresponds directly to the energy of the output beam 20. An optical configuration such as an optical attenuator, e.g., a plate or a coating, or other optics may be formed on or near the detector or beam splitter module 21 to control the intensity, spectral distribution and/or other parameters of the radiation impinging upon the detector (see U.S. patent application Ser No. 09/172,805, Nos. 60/172,749, 60/166,952 and 60/178,620, each of which is assigned to the same assignee as the present application and is hereby incorporated by reference).

One other component of the diagnostic module 18 is preferably a wavelength and/or bandwidth detection component such as a monitor etalon or grating spectrometer (see U.S. patent applications Ser. No. 09/416,344, Nos. 60/186, 003, 60/158,808, and 60/186,096, and Lokai, et al., serial number not yet assigned, "Absolute Wavelength Calibration of Lithography Laser Using Multiple Element or Tandem See Through Hollow Cathode Lamp", filed May 10, 2000, each of which is assigned to the same assignee as the present application, and U.S. Pat. Nos. 4,905,243, 5,978,391, 5,450, 207, 4,926,428, 5,748,346, 5,025,445, and 5,978,394, all of the above wavelength and/or bandwidth detection and monitoring components being hereby incorporated by reference.

Other components of the diagnostic module may include a pulse shape detector or ASE detector, such as are described at U.S. patent application Ser. Nos. 09/484,818 and 09/418, 052, respectively, each of which is assigned to the same assignee as the present application and is hereby incorporated by reference, such as for gas control and/or output beam energy stabilization. There may be a beam alignment monitor, e.g., such as is described at U.S. Pat. No. 6,014,206 which is hereby incorporated by reference.

The processor or control computer 16 receives and processes values of some of the pulse shape, energy, amplified spontaneous emission (ASE), energy stability, energy overshoot for burst mode operation, wavelength, spectral purity and/or bandwidth, among other input or output parameters of the laser system and output beam. The processor 16 also controls the line narrowing module to tune the wavelength and/or bandwidth or spectral purity, and controls the power supply and pulser module 4 and 8 to control preferably the moving average pulse power or energy, such that the energy dose at points on the workpiece is stabilized around a desired value. In addition, the computer 16 controls the gas handling module 6 which includes gas supply valves connected to various gas sources.

The laser gas mixture is initially filled into the laser chamber 2 during new fills. The gas composition for a very stable excimer laser in accord with the preferred embodiment uses helium or neon or a mixture of helium and neon as buffer gas, depending on the laser. Preferred gas composition are described at U.S. Pat. Nos. 4,393,405 and 4,977, 573 and U.S. patent application Ser. Nos. 09/317,526, 09/513,025, No. 60/124,785, Ser. No. 09/418,052, Nos. 60/159,525 and 60/160,126, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas, may be added for increased energy stability and/or as an attenuator as described in the '025 application, mentioned above. Specifically, for the F2-laser, an addition of Xenon and/or Argon may be used. The concentration of xenon or argon in the mixture may range from 0.0001% to 0.1%. For an ArF-laser, an addition of xenon or krypton may be used also having a concentration between 0.0001% to 0.1%.

Halogen and rare gas injections, total pressure adjustments and gas replacement procedures are performed using the gas handling module 6 preferably including a vacuum pump, a valve network and one or more gas compartments. The gas handling module 6 receives gas via gas lines connected to gas containers, tanks, canisters and/or bottles. Preferred gas handling and/or replenishment procedures of the preferred embodiment, other than as specifically described herein, are described at U.S. Pat. Nos. 4,977,573 and 5,396,514 and U.S. patent applications No. 60/124,785, Ser. Nos. 09/418,052, 09/379,034, Nos. 60/171,717, and 60/159,525, each of which is assigned to the same assignee as the present application, and U.S. Pat. Nos. 5,978,406, 6,014,398 and 6,028,880, all of which are hereby incorporated by reference. A Xe gas supply may be included either internal or external to the laser system according to the '025 application, mentioned above.

A general description of the line-narrowing features of the several embodiments of the present is first provided here, followed by a detailed discussion referring FIGS. 2a–6b. Exemplary line-narrowing optics are contained in the optics module 10 include a beam expander, an optional etalon and a diffraction grating, which produces a relatively high degree of dispersion, for a narrow band laser such as is used with a refractive or catadioptric optical lithography imaging system. As mentioned above, the front optics module may include line-narrowing optics as well (see the Nos. 60/166, 277, 60/173,993 and 60/166,967 applications, each being assigned to the same assignee and hereby incorporated by reference). For a semi-narrow band laser such as is used with an all-reflective imaging system, and which is not the subject of the present invention, the grating is replaced with a highly reflective mirror, and a lower degree of dispersion may be produced by a dispersive prism. A semi-narrow narrow band laser would typically have an output beam linewidth in excess of 1 pm and may be as high as 100 pm in some laser systems, depending on the characteristic free-running bandwidth of the laser.

The beam expander of the above exemplary line-narrowing optics of the optics module 10 preferably includes one or more prisms. The beam expander may include other beam expanding optics such as a lens assembly or a converging/diverging lens pair. The grating or highly reflective mirror is preferably rotatable so that the wavelengths reflected into the acceptance angle of the resonator can be selected or tuned. Alternatively, the grating, or other optic or optics, or the entire line-narrowing module may be pressure tuned, such as it set forth in the No. 60/178,445 and Ser. No. 09/317,527 applications, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating to doubly disperse the beam, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, Nos. 60/124,241, 60/140,532, 60/147,219 and 60/140,531, 60/147,219, 60/170,342, 60/172,749, 60/178,620, 60/173,993, 60/166,277, 60/166, 967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

Optics module 12 preferably includes means for outcoupling the beam 20, such as a partially reflective resonator reflector. The beam 20 may be otherwise outcoupled such as by an intraresonator beam splitter or partially reflecting surface of another optical element, and the optics module 12 would in this case include a highly reflective mirror. The optics control module 14 controls the optics modules 10 and 12 such as by receiving and interpreting signals from the processor 16, and initiating realignment or reconfiguration procedures (see the '241, '695, 277, 554, and 527 applications mentioned above).

A detailed discussion of the line-narrowing configurations of an oscillator element of the laser system according to the preferred embodiment is now set forth with reference to FIGS. 2a–2f. Several embodiments of an oscillator of the laser system using line-narrowing techniques for the molecular fluorine laser, are shown in FIGS. 2a–2f to meet or substantially meet the first object of the invention.

Figure 2A:
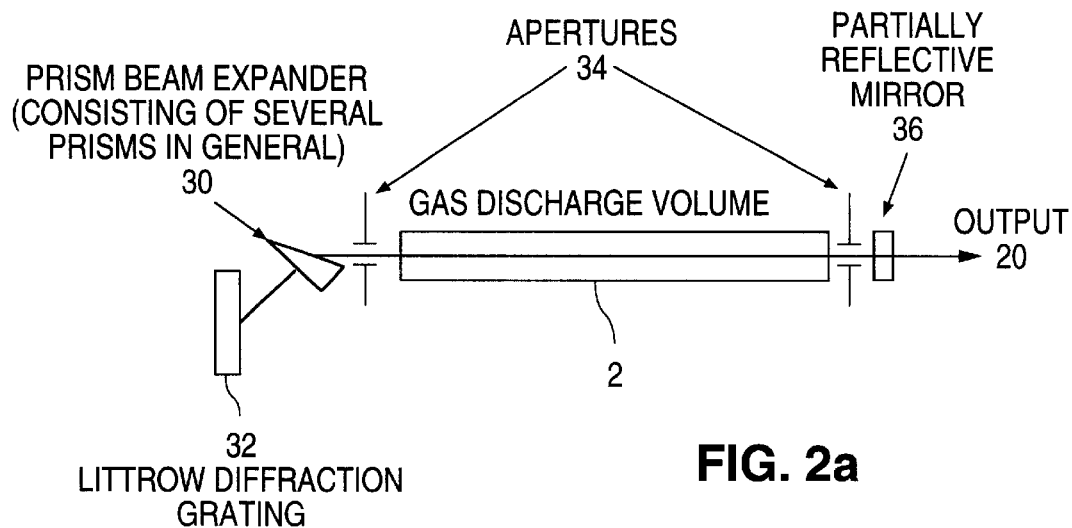
FIGS. 2a–2f schematically show several alternative embodiments in accord with a first aspect of the invention including various line narrowing resonators and techniques utilizing line-narrowed oscillators for the molecular fluorine laser.

FIG. 2a schematically shows an oscillator of a laser system according to a first embodiment including a discharge chamber 2 preferably containing molecular fluorine and a buffer gas of neon, helium or a combination thereof (see the Ser. No. 09/317,526 application), and having a pair of main discharge electrodes 3 (not shown) and a preionization arrangement (also not shown) therein. The system shown in FIG. 2a also includes a prism beam expander 30 and a diffraction grating 32 arranged in a Littrow configuration. The beam expander 30 may include one or more prisms and preferably includes several prisms. The beam expander serves to reduce divergence of the beam incident onto the grating, thus improving wavelength resolution of the wavelength selector. The grating is preferably a high blaze angle echelle grating (see the No. 60/170,342 application incorporated by reference above).

The system shown includes a pair of apertures 34 in the resonator which reject stray light and reduce broadband background, and can also serve to reduce the linewidth of the beam by lowering the acceptance angle of the resonator. Alternatively, one aperture 34 on either side of the chamber 2 may be included, or no apertures 34 may be included. Exemplary apertures 34 are set forth at U.S. Pat. No. 5,161,238, which is assigned to the same assignee and is hereby incorporated by reference (see also the Ser. No. 09/130,277 application incorporated by reference above).

The system of FIG. 2a also includes a partially reflecting output coupling mirror 36. The outcoupling mirror 36 may be replaced with a highly reflective mirror, and the beam may be otherwise output coupled such as by using a polarization reflector or other optical surface within the resonator such as a surface of a prism, window or beam-splitter (see, e.g., U.S. Pat. No. 5,150,370, incorporated by reference above).

Figure 2B:
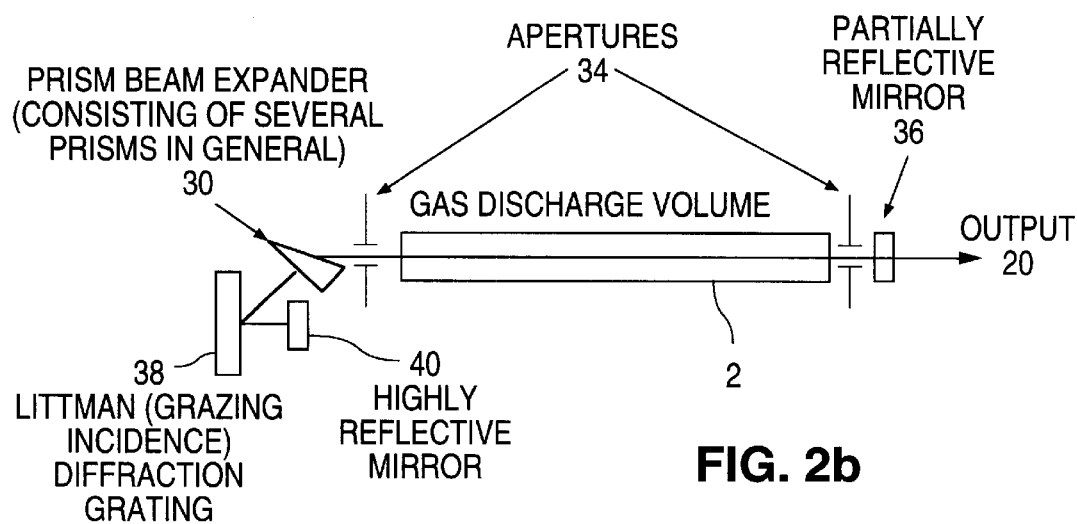

The system shown at FIG. 2b includes the chamber 2, the apertures 34, the partially reflecting output coupling mirror 36 and beam expander 30 described above with respect to FIG. 2a. The system of FIG. 2b also includes a diffraction grating 38 and a highly reflective mirror 40. The grating 38 preferably differs from the grating 32 of FIG. 2a either in its orientation with respect to the beam, or its configuration such as its blaze angle, etc., or both. The laser beam is incident onto the grating 38 at an angle closer to 90E than for the grating 32. The incidence angle is, in fact, preferably very close to 90E. This is arrangement is referred to here as the Littman configuration. The Littman configuration increases the wavelength dispersion of the grating 38. After passing through or reflecting from the diffraction grating 38, the diffracted beam is reflected by the highly reflective mirror 40. The tuning of the wavelength is preferably achieved by tilting the highly reflective mirror 40. As mentioned above with respect to the exemplary arrangement, tuning may be achieved otherwise by rotating another optic or by pressure tuning one or more optics, or otherwise as may be understood by one skilled in the art.

Figure 2C:
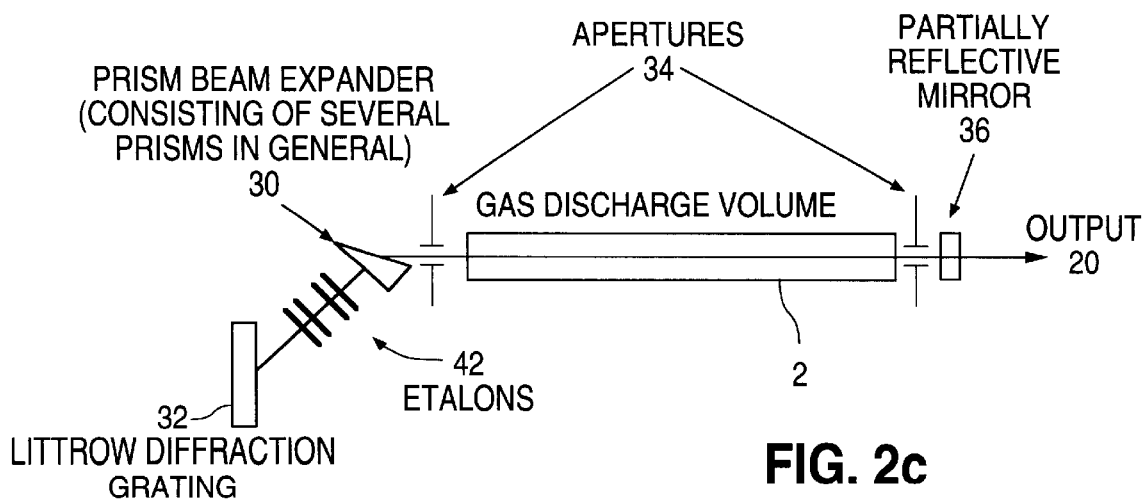

FIG. 2c schematically shows another embodiment of an oscillator having a laser chamber 2, apertures 34, outcoupler 36, beam expander 30 and Littrow diffraction grating 32, preferably as described above. In addition, the system of FIG. 2c includes one or more etalons 42, e.g, two etalons are shown, which provide high-resolution line narrowing, while the grating 32 serves to select a single interference order of the etalons 42. The etalon or etalons 42 may be placed in various positions in the resonator, i.e., other than as shown. For example, a prism or prisms of the beam expander 30 may be positioned between an etalon or etalons 42 and the grating. An etalon 42 may be used as an output coupler, as will be described in more detail below with reference to FIGS. 2e–2f. The arrangement of FIG. 2c (as well as FIG. 2d below) including an etalon or etalons 42 may be varied as described at any of U.S. patent applications Nos. 60/162,735, 60/178,445, or 60/158,808, each of which is assigned to the same assignee and is hereby incorporated by reference.

Figure 2D:
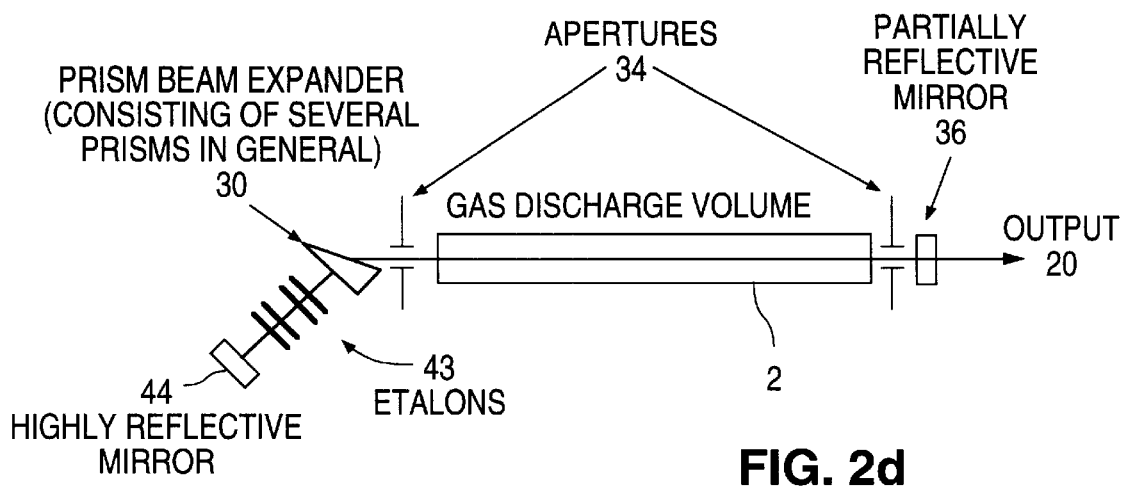

FIG. 2d shows another embodiment of the laser system having one or more etalons 43, e.g., two etalons 43 are shown. The system of FIG. 2d is the same as that of FIG. 2c except that the grating 32 is replaced with a highly reflective mirror, and the etalons 43 are differently configured owing to the omission of the grating 32 which is not available, as in the system of FIG. 2c, to select a single interference order of the etalons 43. The free spectral ranges of etalons 43 are instead adjusted in such a way that one of the etalons 43, preferably the first etalon 43 after the beam expander 30, selects a single order of the other etalon 43, e.g., the second etalon 43. The second etalon 43 of the preferred arrangement is, therefore, allowed to have a smaller free spectral range and higher wavelength resolution. Some further alternative variations of the etalons 43 of the system of FIG. 2d may be used as set forth in U.S. Pat. No. 4,856,018, which is hereby incorporated by reference.

Figure 2E:
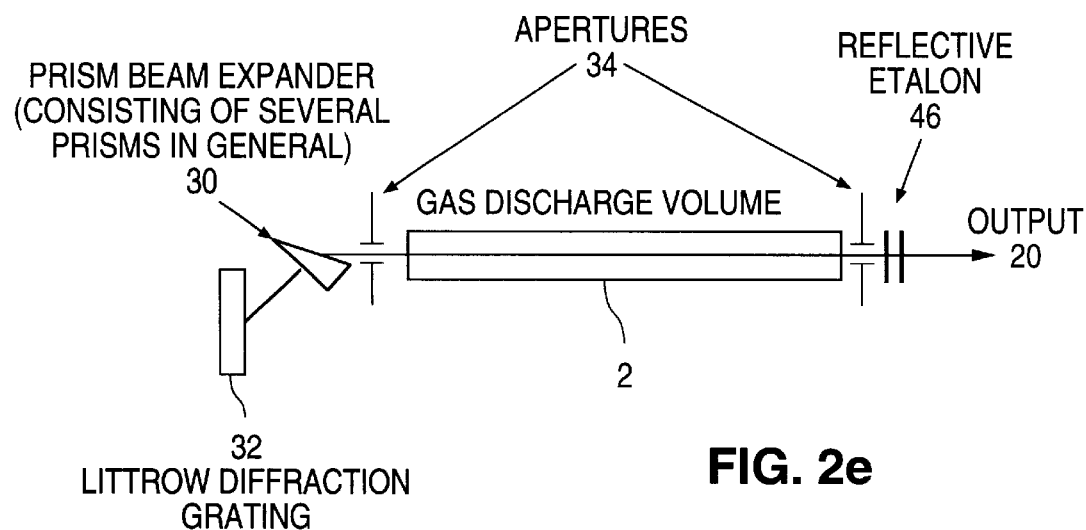
Figure 2F:
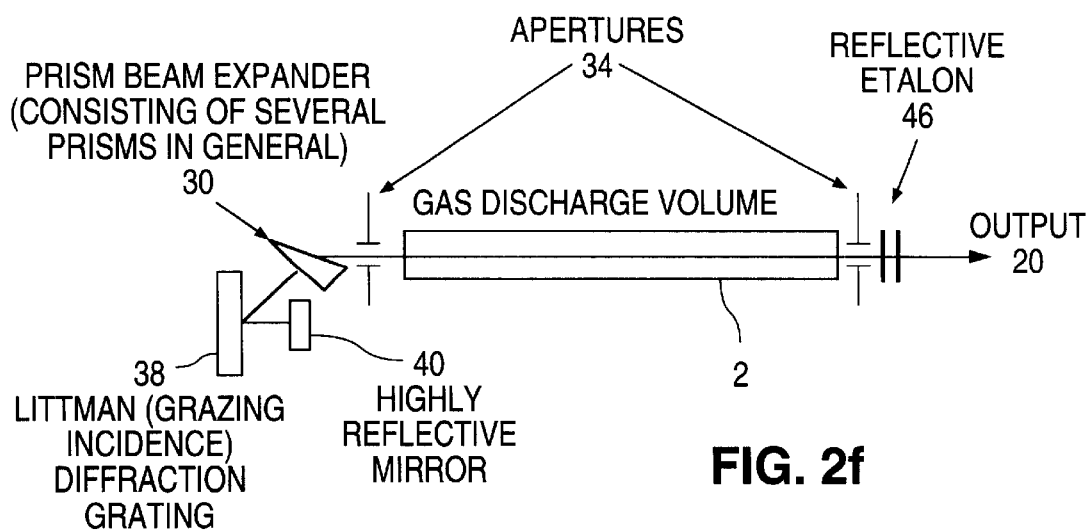

FIGS. 2e and 2f schematically show embodiments similar to the arrangements described above with reference to FIGS. 2a and 2b, respectively, which differ in that the partially reflecting outcoupler mirror 36 is replaced with a reflective etalon outcoupler 46. The etalon outcoupler 46 is used in combination with the grating 32 or 38 and beam expander 30 of FIGS. 2e and 2f, respectively, wherein the grating 32 or 38 selects a single interference order of the etalon outcoupler 46. Alternatively, one or more dispersive prisms or another etalon may be used in combination with the etalon outcoupler 46 for selecting a single interference order of the etalon 46. The grating 32 or 38 restricts wavelength range to a single interference order of the outcoupler etalon 46. Variations of the systems of FIGS. 2e and 2f that may be used in combination with the systems set forth at FIGS. 2e and/or 2f are set forth at the Ser. No. 09/317,527 and No. 60/166,277 applications, incorporated by reference above, and U.S. Pat. Nos. 6,028,879, 3,609,586, 3,471,800, 3,546,622, 5,901, 163, 5,856,991, 5,440,574, and 5,479,431, and H. Lengfellner, Generation of tunable pulsed microwave radiation by nonlinear interaction of Nd:YAG laser radiation in GaP crystals, Optics Letters, Vol. 12, No. 3 (March 1987), S. Marcus, Cavity dumping and coupling modulation of an etalon-coupled $CO_2$ laser, J. Appl. Phys., Vol. 53, No. 9 (September 1982), and The physics and technology of laser resonators, eds. D. R. Hall and P. E. Jackson, at p. 244, each of which is hereby incorporated by reference.

In all of the above embodiments shown and described with reference to FIGS. 2a–2f, the material used for the prisms of the beam expanders 30, etalons 42, 43, 46 and laser windows is preferably one that is highly transparent at wavelengths below 200 nm, such as at the 157 nm output emission wavlength of the molecular fluorine laser. The materials are also capable of withstanding long-term exposure to ultraviolet light with minimal degradation effects. Examples of such materials are $CaF_2$, $MgF_2$, BaF, $BaF_2$, LiF, $LiF_2$, and $SrF_2$. Also, in all of the above embodiments of FIGS. 2a–2f, many optical surfaces, particularly those of the prisms, preferably have an anti-reflective coating on one or more optical surfaces, in order to minimize reflection losses and prolong their lifetime.

Also, as mentioned in the general description above, the gas composition for the $F_2$ laser in the above configurations uses either helium, neon, or a mixture of helium and neon as a buffer gas. The concentration of fluorine in the buffer gas preferably ranges from 0.003% to around 1.0%, and is preferably around 0.1%. The addition of a trace amount of xenon, and/or argon, and/or oxygen, and/or krypton and/or other gases may be used for increasing the energy stability, burst control, or output energy of the laser beam. The concentration of xenon, argon, oxygen, or krypton in the mixture may range from 0.0001% to 0.1%. Some alternative gas configurations including trace gas additives are set forth at U.S. patent application Ser. Nos. 09/513,025 and 09/317,526, each of which is assigned to the same assignee and is hereby incorporated by reference.

All of the oscillator configurations shown above at FIGS. 2a–2f may be advantageously used to produce a VUV beam 20 having a wavelength of around 157 nm and a linewidth of around 1 pm or less. Some of those configurations having an output linewidth of less than 1 pm already meet the above first object of the invention with respect to the linewidth. Those oscillators may be used with other elements, such as an amplifier, as set forth below at FIGS. 3a–6b to meet the second object of the invention, i.e., to achieve sufficient output power for substantial throughput at a 157 nm lithography fab. Other oscillators producing linewidths above 1 pm may be advantageously used in combination with other line-narrowing elements such as a spectral filter, as set forth below at FIGS. 3a–4b, to meet that first object, and with an amplifier as set forth in the embodiments of FIGS. 3a–4b to meet the second object.

Figure 3A:
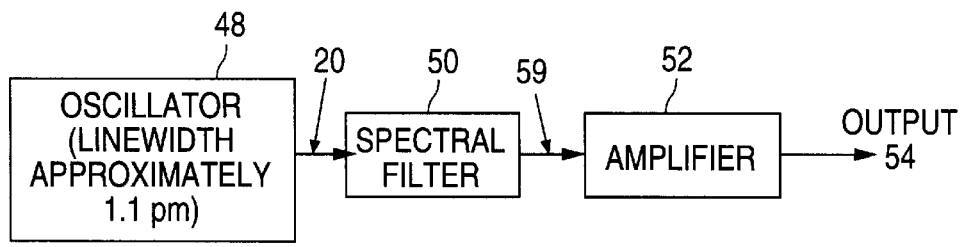
FIG. 3a schematically shows a preferred embodiment in accord with a second aspect of the invention including an oscillator, a spectral filter in various configurations, and an amplifier.

FIG. 3a schematically illustrates, in block form, a laser system in accord with a preferred embodiment of the present invention, wherein a narrower linewidth is desired than is output by the oscillator 48, and higher power is desired than is output by the oscillator 48. To reduce the linewidth, the output beam 20 of the oscillator 48 is directed through a spectral filter 50. To increase the output power, the beam 20 is directed through an amplifier 52.

The system of FIG. 3a includes a line-narrowed oscillator 48, a spectral filter 50 and an amplifier 52. Various preferred configurations of the spectral filter 50 are described below with reference to FIGS. 3b–3d. The oscillator 48 of FIG. 3a is an electrical discharge molecular fluorine laser producing a spectral linewidth of approximately 1 pm, and is preferably one of the configurations described above with respect to FIGS. 2a–2f, or a variation thereof as described above, or as may be understood as being advantageous to one skilled in the art, such as may be found in one or more of the reference incorporated by reference above. The oscillator 48 is followed by the spectral filter 50, which transmits light in a narrower spectral range, i.e., less than the linewidth of the output beam 20 from the oscillator or less than around 1 pm.

Lastly, the transmitted beam is amplified in an amplifier 52 based on a separate discharge chamber to yield an output beam 54 that meets both the first and second objects of the invention. Preferably, the oscillator and amplifier discharges are synchronized using a delay circuit and advantageous solid-state pulser circuit such as is described at U.S. patent application No. 60/204,095 and at U.S. Pat. No. 6,005,880, each of which is assigned to the same assignee and is hereby incorporated by reference.

Figure 3B:
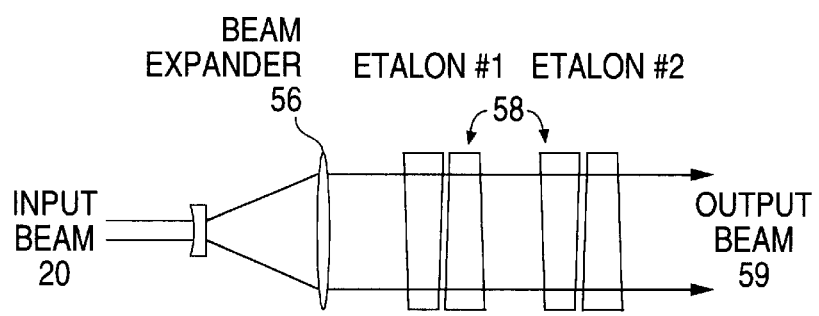
FIGS. 3b–3d schematically show alternative embodiments of spectral filters in further accord with the second aspect of the invention.
Figure 3C:
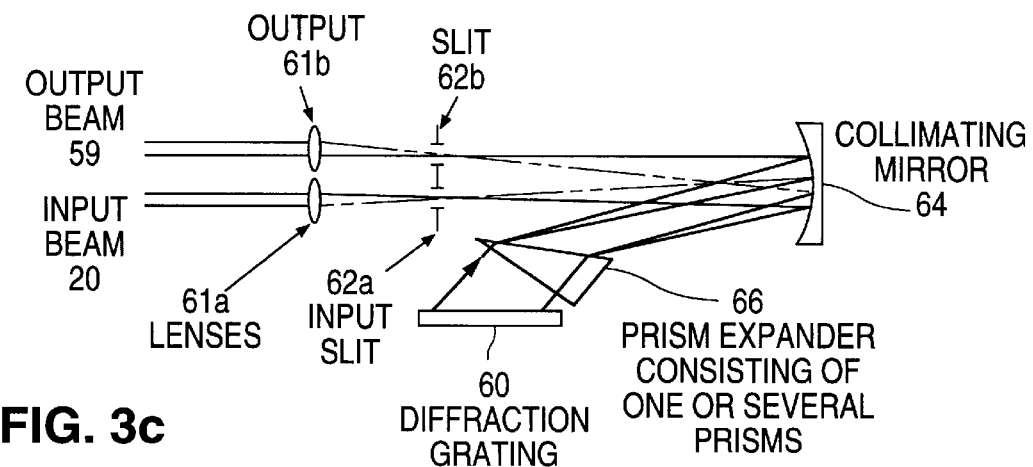
Figure 3D:
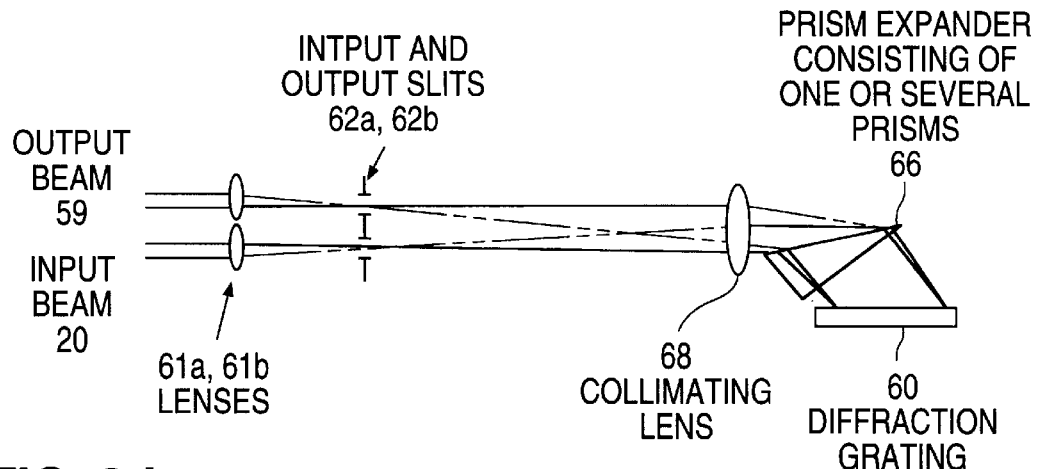

The spectral filter 50 is preferably includes one of the arrangements shown in FIGS. 3b–3d. Variations may be understood as advantageous to one skilled in the art using any of a large number of combinations of prisms, gratings, grisms, holographic beam samplers, etalons, lenses, apertures, beam expanders, collimating optics, etc., for narrowing the linewidth of the input beam 20, preferably without consuming a substantial fraction of the energy of the input beam 20.

FIG. 3b illustrates a first spectral filter 50 embodiment including a beam expander followed by one or more etalons 58 to yield an output beam having a linewidth substantially below the linewidth, e.g., around 1 pm, of the input beam 20 to meet the first object of the invention. Each etalon 58 includes two partially reflecting surfaces of reflectivity R, separated by a preferably gas-filled gap of thickness D. The transmission spectrum of the etalon $T(\lambda)$ is described by a periodic function of the wavelength X:

$$T(\lambda) = (1 + (4F^2/\pi^2)\sin(2\pi n D \cos(73)/\lambda))^{-1} \quad (1)$$

where n is the refractive index of the material, preferably an inert gas, filling the etalon 58, Θ is the tilt angle of the etalon 58 with respect to the beam, and F is the finesse of the etalon 58 which is defined as:

$$F = \pi R^{1/2}/(1-R) \quad (2)$$

The reflectivity R and spacing of the etalon D can be selected in such a way that only a single transmission maximum overlaps with the emission spectrum of the broader-band oscillator 48. For instance, if the finesse of the etalon 58 is selected to be 10, then the spectral width of the transmission maximum is roughly 1/10 of the free spectral range (FSR) of the etalon 58. Therefore, selecting a free spectral range of 1 pm will produce a transmitted beam with spectral linewidth of 0.1 pm, without sidebands since the linewidth of the oscillator (48) output (approximately 1 pm) is significantly less than two times the FSR.

Using multiple etalons 58 allows a higher contrast ratio, which is defined as a ratio of the maximum transmission to the transmission of the wavelength halfway between the maxima. This contrast ratio for a single etalon is approximately equal to $(1+4F^2/\pi^2)$. Higher finesse values lead to higher contrast. For several etalons 58, the total contrast ratio will be $(1+4F^2/\pi^2)^n$ where n is the number of etalons 58 used. Additionally, the spectral width of the transmission maxima will be reduced with increased number of etalons 58 used. Disadvantages of using several etalons 58 include high cost and complexity of the apparatus and increased optical losses.

The beam expander 56 shown at FIG. 3b serves to reduce the divergence of the beam incident onto the etalons 58. From the formula (1), it follows that a change in the beam incidence angle 1 causes a shift of the wavelength at which maximum transmission occurs. Assuming an FSR of 1 pm, the etalon spacing is D=1.2 cm. If the transmission interference spectrum of the etalon 58 is at its maximum at normal incidence (Θ=0), then the angle Θ, at which the transmission spectrum reaches maximum again is $\Theta \sim (\lambda/nD)^{1/2}$=3.6 mrad. Therefore, it is preferred that the spectral filter 50 shown at FIG. 3b be configured such that the divergence of the beam is below $\Theta$, and preferably by a factor comparable to the finesse F of the etalon 58. Since the divergence of a typical molecular fluorine laser is several millirads, the advantage of using the beam expander 56 to reduce this divergence from typically above $\Theta$ as it is output from the oscillator 48 to below $\Theta$, is may be understood. It is also preferred to use one or more apertures 34 in the oscillator 48 to reduce its output divergence (see the Ser. No. 09/130,277 application, mentioned above).

The gaps between the plates of the etalons 58 are preferably filled with an inert gas. Tuning of the transmitted wavelength can be accomplished by changing the pressure of the gas as described in the Ser. No. 09/317,527 application, mentioned above. In addition to pressure tuning and rotation tuning of the etalon's output transmission spectrum, the etalons 58 may be piezoelectrically tuned such as to geometrically alter the gap spacing.

FIG. 3c schematically illustrates a second embodiment of the spectral filter 50 of FIG. 3a generally utilizing a diffraction grating 60. Although there are other ways to configure the spectral filter 50 according to the second embodiment using a grating 60, an example is shown at FIG. 3c and described here. The spectral filter 50 shown at FIG. 3c is a Czerny-Turner type spectrometer, modified to achieve high resolution. The input beam 20 in focused by a lens 61 a through an input slit 62a after which the beam is incident on a collimating mirror 64. After reflection from the mirror 64, the beam is incident on a beam expander 66 and then onto the grating 60. The beam is dispersed and reflected from the grating 60, after which the beam retraverses the beam expander 66, and is reflected from the collimating mirror 64 through an output slit 62b at or near the focal point of a lens 62b. The output beam 59 then has a linewidth substantially less than the linewidth, e.g., around 1 pm, of the input beam 20, or substantially less than 1 pm to meet the first object of the invention.

The diffraction grating 60 is preferably a high blaze echelle grating 60. The wavelength dispersion of this preferred grating 60 is described by the following formula:

$$d\lambda/d\Theta = (2/\lambda)\tan\Theta \qquad (3)$$

where $\Theta$ is the incidence angle. The spectral width $\Delta\lambda$ of the transmitted beam is determined by the dispersion $d\lambda/d\Theta$ of the grating 60, the magnification factor M of the prism expander 66, the focal length L of the collimating mirror 64 and the width d of the slits 62a, 62b of the spectrometer:

$$\Delta\lambda = d(LMd\lambda/d\Theta)^{-1} \qquad (4)$$

For example, using an echelle grating 60 wherein the incidence angle E) is 78.6°, L=2 m and M=8, the slit width d which would achieve 0.1 pm resolution for the spectral filter 50 of FIG. 3c is around d=0.1 mm. It is preferred, therefore, to reduce the divergence of the oscillator 48 in order to increase the transmission of the beam 20 through the input slit 61a. This can be advantageously achieved by using apertures inside the resonator of the oscillator 48 (see again the Ser. No. 09/130,277 application, mentioned above).

The third example of a spectral filter 50 that may be used in illustrated at FIG. 3d. The spectral filter 50 of FIG. 3d differs from that shown at FIG. 3c in that a collimating lens 68 is used in the embodiment of FIG. 3d, rather than a collimating mirror 64, as is used in the embodiment of FIG. 3c. An advantage of the embodiment of FIG. 3d is its simplicity and the absence of astigmatism introduced by the mirror 64 of FIG. 3c at non-zero incidence angle.

It is useful to reiterate here that synchronization of the electrical discharge pulses in the chambers 2 of the oscillator 48 and amplifier 52 is preferred in order to ensure that the line-narrowed optical pulse from the oscillator 48 arrives at the chamber 2 of the amplifier 52 at the instance when the gain of the amplifier 52 is at or near its maximum. Additionally, this preferred synchronization timing should be reproducible from pulse to pulse to provide high energy stability of the output pulses. The preferred embodiment electronic circuitry allowing this precise timing control is described at U.S. Pat. No. 6,005,880 and U.S. patent application No. 60/204,095, as mentioned above.

FIG. 4a shows the use of a single discharge chamber 70 that provides the gain medium for both an oscillator and an amplifier. The setup of FIG. 4a includes the discharge chamber 70 within a resonator including a highly reflective mirror 72 and a partially reflecting outcoupling mirror 74. A pair of apertures 34 are also included, as described above, to match the divergence of the resonator of this oscillator 48. A small portion of the cross-section of the discharge volume is used to produce an un-narrowed beam 76 with this oscillator configuration. It is also possible to include one or more line-narrowing components with this oscillator configuration, or to otherwise modify the oscillator according to the description set forth above with respect to FIGS. 2a–2f.

Similar to the embodiment shown and described with respect to FIG. 3a, this un-narrowed output is then directed through a spectral filter 50, which is preferably one of the embodiments described in FIGS. 3b–3d. Given the significant time (e.g., several nanoseconds) that it takes for the beam to traverse the spectral filter 50, it is preferred to adjust the arrival time of the filtered pulse to a second maximum of the discharge current. To achieve this temporal adjustment, an optical delay line is preferably inserted after the spectral filter 50. The delay line may be one of those described at U.S. patent application No. 60/130,392, which is assigned to the same assignee and is hereby incorporated by reference.

FIGS. 4b(i)–(iii) illustrate the electrical current through the discharge gap, the intensity of the un-narrowed beam 76 and the output 59 of the oscillator-amplifier system, each as a function of time. The current exhibits several cycles of oscillations, as shown in FIG. 4b(i). The optical pulse shown at FIG. 4b(ii) evolves towards the end of the first maximum (a) of current. The second maximum of electrical current is separated from the first one by approximately 20 nanoseconds, thus providing sufficient time for the beam 76 to traverse the spectral filter 50 and additional optical delay line 78. This discussion with respect to the timing of the successive maxima in the electrical discharge current reveals how the additional optical delay line 78 may be advantageously used to precisely tune the arrival time of the pulse at the chamber 70 (amplifier). The line-narrowed beam from the spectral filter 50, whose temporal pulse shape is shown at FIG. 4b(iii), thus overlaps the second maximum b of the electrical current shown at FIG. 4b(i) of the amplifier and is amplified, and thus a line-narrowed beam 59, i.e., substantially less than 1 pm, is output with sufficient power to meet the first and second objects of the invention.

Figure 5B:
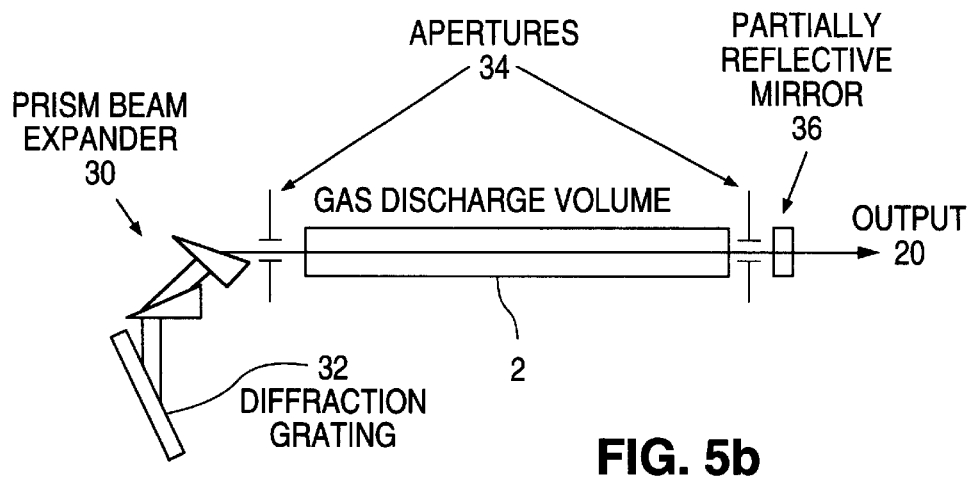
FIGS. 5b–5f schematically show alternative embodiments of line-narrowed oscillators in further accord with the third aspect of the invention.

FIG. 5a shows the use of a line-narrowed oscillator followed by a power amplifier made in a separate discharge chamber. Any of the embodiments shown and described above including those discussed with respect to the exemplary embodiments, the patents and publications incorporated by reference, and the embodiments described with respect to FIGS. 2a–2f can be used to narrow the bandwidth of the oscillator. Examples of the preferred line-narrowed oscillator 48 are set forth at FIGS. 5b–5f.

The line-narrowed oscillator 48 schematically shown at FIG. 5(b) uses a prism beam expander 30 and grating 32, preferably as described in one of the U.S. Pat. No. 5,559,816 US, 298 22 090.3 DE, U.S. Pat. Nos. 4,985,898, 5,150,370 and 5,852,627 patents, each being incorporated by reference above. Alternatively, the Littman configuration may be used (see discussion above with respect to FIG. 2b). As discussed above with respect to the embodiments of FIGS. 2a–4a, the additional apertures 34 in the resonator reduce divergence of the beam and, therefore, advantageously increase the resolution of the wavelength selector (again, see the Ser. No. 09/130,277 application for details).

Figure 5C:
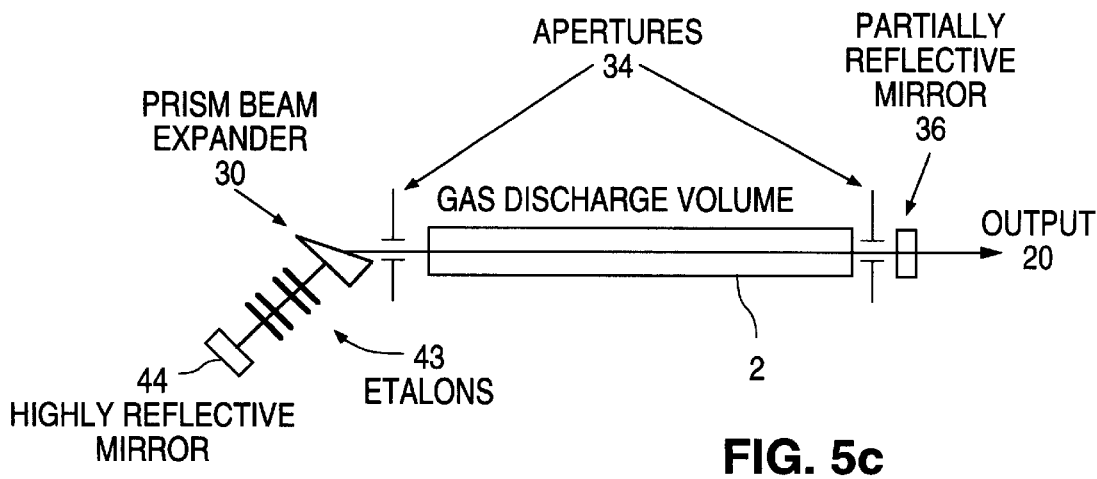

The embodiment shown in FIG. 5c utilizes multiple etalons 43 as wavelength selective elements (see FIG. 2d). The prism beam expander 30 in combination with the apertures 34 helps to reduce the divergence of the beam in the etalons 43 thus improving resolution of the wavelength selector. Additionally, this reduces the intensity of the beam at a particular area of the surfaces of the etalons 43, thus extending their lifetime.

Figure 5D:
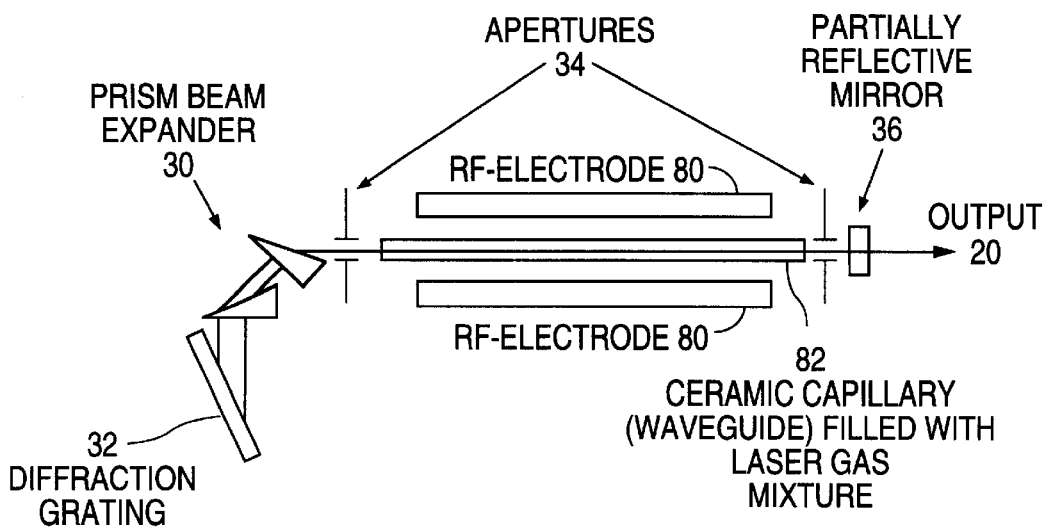
Figure 5E:
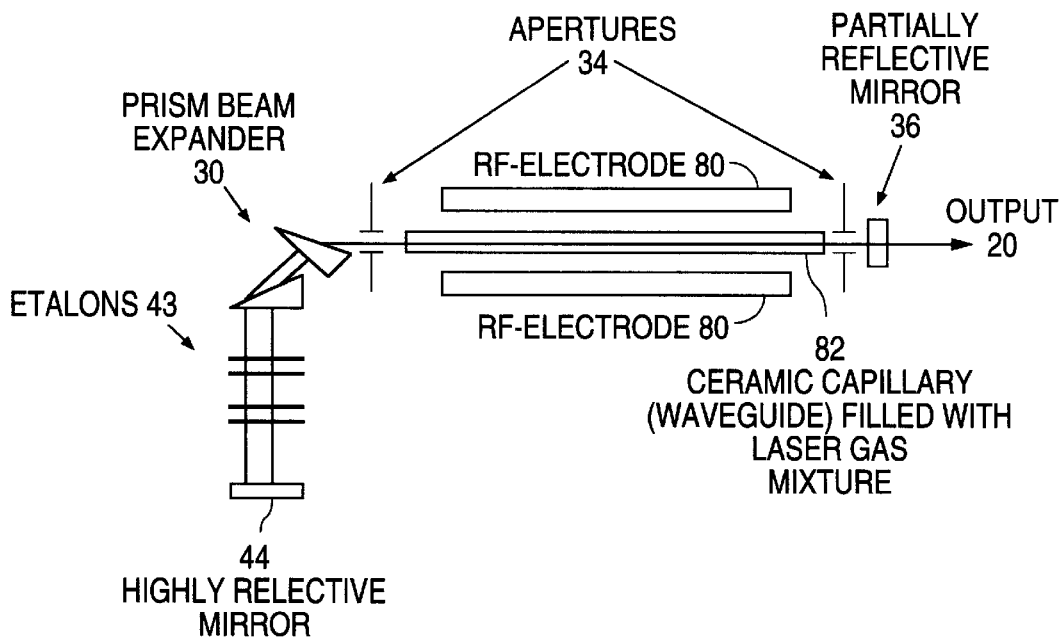

FIGS. 5d–5e show alternative arrangements that each include an RF or microwave excited waveguide laser as an oscillator. The arrangement of FIG. 5d preferably includes a pair of RF-electrodes 80 and a waveguide 82 preferably including a ceramic capillary filled with a laser active gas mixture. Any of the resonator configurations shown in FIGS. 2a–5c may be used in this embodiment, wherein the discharge chamber 2 is replaced with the RF-excited waveguide arrangement shown in FIG. 5d. Features of the waveguide laser that may be used in the arrangement of FIGS. 5d–5e may be found at C. P. Christenson, Compact Self-Contained ArF Laser, Performing Organization Report Number AFOSR IR 95-0370; T. Ishihara and S. C. Lin, Theoretical Modeling of Microwave-Pumped High-Pressure Gas Lasers, Appl. Phys. B 48, 315–326 (1989); and Ohmi, Tadahiro and Tanaka, Nobuyoshi, Excimer Laser Oscillation Apparatus and Method, Excimer Laser Exposure Apparatus, and Laser Tube, European Patent Application EP 0 820 132 A2, each of which is hereby incorporated by reference. RF-excited lasers are commonly operated with a carbon dioxide gas medium, e.g., as discussed in Kurt Bondelie "Sealed carbon dioxide lasers achieve new power levels", Laser Focus World, August 1996, pages 95–100, which is hereby incorporated by reference.

The specific arrangement shown in FIG. 5d includes a prism beam expander 30 and a grating 32 in Littrow configuration. A Littman configuration may be used here (see FIGS. 2b and 2f) including the grating 38 and HR mirror 40. A pair of apertures 34 are again included, particularly for matching the divergence of the resonator. A partially reflecting mirror 36 outcouples the beam 20. An etalon outcoupler 46 may be used instead of the mirror 36 (see FIGS. 2e–2f).

The arrangement schematically shown at FIG. 5e is the same as that of FIG. 5d, except that the grating is replaced with a one or more etalons 43 and an HR mirror 44. A grating 32 or 38 may be used along with the etalons 43, and an etalon outcoupler 46 may be used instead of the partially reflecting mirror 36.

An advantage of this RF-excited waveguide type of laser is its long pulse, which allows more efficient line narrowing, since the linewidth is approximately inversely proportional to the number of round trips of the beam in the resonator. Additionally, the RF-excited waveguide laser has a small discharge width (on the order of 0.5 mm) which allows high angular resolution of the wavelength selector based on the prisms of the beam expander 30 and the diffraction grating 32. This holds for both of the embodiments shown at FIGS. 5d–5e.

Figure 5F:
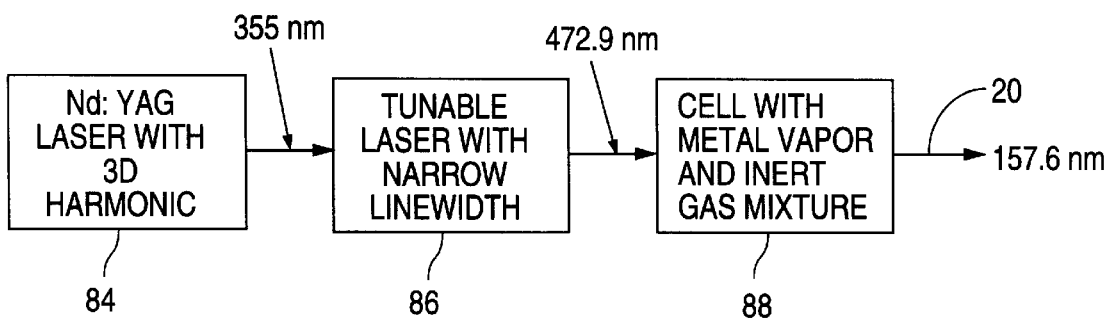

FIG. 5f schematically shows another source of a narrow linewidth beam that may be used in accordance with the present invention to serve as the oscillator 48 in the embodiment of FIG. 5a. The arrangement of FIG. 5f includes a solid state laser 85 with a third harmonic output at 355 nm, such as diode pumped, Nd:YAG laser or other such type laser as may be described, e.g., at U.S. Pat. No. 6,002,697, which is assigned to the same assignee and is hereby incorporated by reference, or as may be otherwise known to one skilled in the art. The solid state laser 85, in turn, pumps a narrow linewidth tunable laser 86, such as a dye laser or optical parametric oscillator, emitting, e.g., around 472.9 nm. This 472.9 nm radiation is focussed into a gas cell 88 containing a mixture of halide metal and inert gas, in order to produce a third harmonic beam at 157.6 nm. Such third harmonic generation in gases has been described at: Kung A. H., Young J. F., Bjorklung G. C., Harris S. E., Physical Review Letters, v.29, Page 985 (1972); and Kung A. H., Young J. F., Harris S. E, Applied Physics Letters, v.22 page 301 (1973), each of which is hereby incorporated by reference.

Figure 6A:
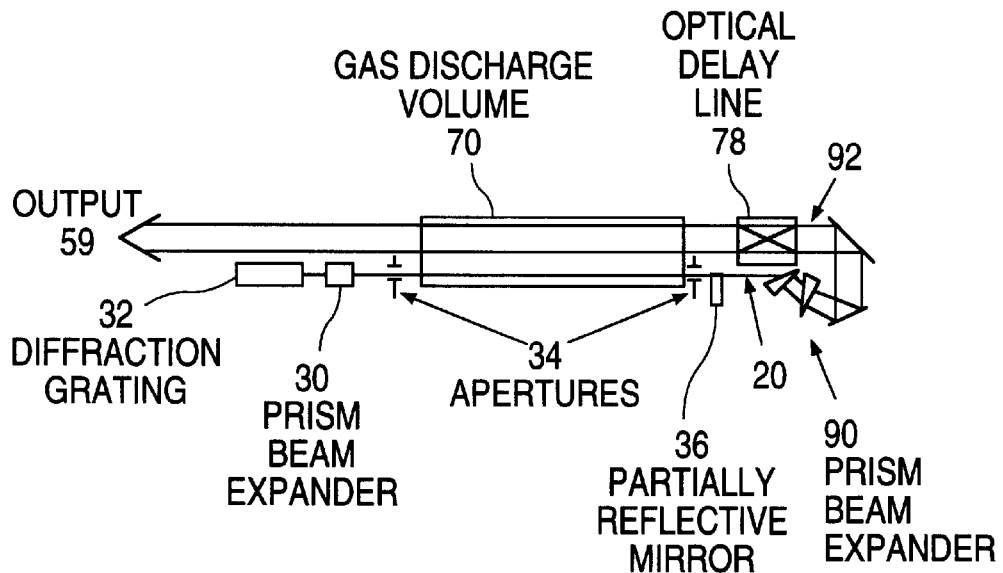
FIGS. 6a–6b schematically show alternative embodiments in accord with a fourth aspect of the invention including a single discharge chamber providing the gain medium for both an oscillator with line-narrowing and an amplifier.
Figure 6B:
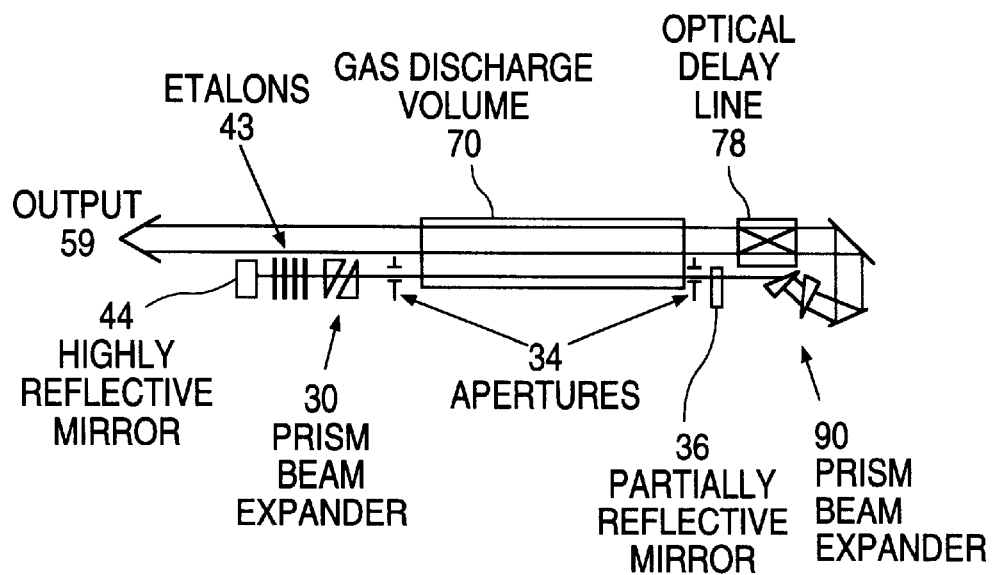

FIGS. 6a and 6b schematically illustrate further embodiments wherein a portion of the discharge volume of a discharge chamber 2 is used as an oscillator with line narrowing, and the same discharge chamber 2 is used as an amplifier 52. The arrangement of FIG. 6a is similar to that shown at FIG. 4a except that the linewidth of the beam 30 is narrowed within the resonator of the oscillator, and no spectral filter 50 is preferably used. A spectral filter 50 may alternatively be used in addition to the line-narrowing optics of the oscillator of FIG. 6a. Again, the line-narrowing arrangement of the oscillator may be modified as set forth in any of the descriptions above (see particularly FIGS. 2a–2f, 5c and 50, or as set forth in any of the patents, patent applications or publications incorporated by reference in this application, or as otherwise understood by one skilled in the art, to produce a narrow output beam 20 sufficient to meet the first object of the invention. The output beam 20 from the oscillator is expanded by an external beam expander 90, preferably comprising one or more prisms and alternatively comprising a lens arrangement.

The expanded beam 92 is then directed through a delay line 78 (see the '392 application) to synchronize the pulse with the amplification maxima of the chamber 70, as described above. The optical delay line 78 serves to fine tune the arrival time of the optical pulse to the amplifier section, similar to the embodiment shown and described with respect to FIGS. 4a–4b(iii). The expanded beam 20 then advantageously fills a substantial portion of the rest of the discharge cross section, and is amplified.

In the above embodiments, it is preferred to adjust the gas mixture in the discharge chamber 2, 70 of the oscillator, to obtain the longest possible pulse. Additionally, the waveform of the discharge current can be modified by deliberately introducing an impedance mismatch of the pulse forming circuitry and discharge gap. The impedance mismatch leads to a longer discharge time and thus, to a longer optical pulse. The lower gain resulting from such modification means lower efficiency of the oscillator. However, in the embodiments discussed above, the amount of reduction in the output power of the oscillator is regained at the amplification stage.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. A narrow band molecular fluorine laser system, comprising:
    an oscillator, comprising:
        a discharge chamber filled with a laser gas including molecular fluorine and a buffer gas,
        a plurality of electrodes within the discharge chamber connected to a discharge circuit for energizing the laser gas, and
        a resonator including said discharge chamber and further comprising an aperture within the resonator for generating a laser beam having a wavelength around 157 nm, a linewidth less than 1 pm, and an energy below a predetermined energy; and
    an amplifier, comprising:
        a gas-filled second discharge chamber at least including molecular fluorine;
        a second plurality of electrodes within the second discharge chamber connected to a same or a different discharge circuit for energizing the gas within the second discharge chamber so that gain is stimulated when the 157 nm beam generated by the oscillator is passed through the energized gas of the amplifier, and
    wherein the laser beam generated by the oscillator and passed through the amplifier has an increased energy so that laser pulses output by the oscillator and passed through the amplifier have an energy that is equal to or above said predetermined pulse energy.

2. The laser system of claim 1, wherein the aperture is positioned between the discharge chamber and a resonator reflector mirror.

3. A narrow band molecular fluorine laser system, comprising:
    an oscillator, comprising:
        a discharge chamber filled with a laser gas including molecular fluorine and a buffer gas,
        a plurality of electrodes within the discharge chamber connected to a discharge circuit for energizing the laser gas, and
        a resonator including said discharge chamber and further comprising a first aperture on one side of the discharge chamber and a second aperture on the other side of the discharge chamber for generating a laser beam having a wavelength around 157 nm, a linewidth less than 1 pm, and an energy below a predetermined energy; and
    an amplifier, comprising:
        a gas-filled second discharge chamber at least including molecular fluorine;
        a second plurality of electrodes within the second discharge chamber connected to a same or a different discharge circuit for energizing the gas within the second discharge chamber so that gain is stimulated when the 157 nm beam generated by the oscillator is passed through the energized gas of the amplifier, and
    wherein the laser beam generated by the oscillator and passed through the amplifier has an increased energy so that laser pulses output by the oscillator and passed through the amplifier have an energy that is equal to or above said predetermined pulse energy.

4. The laser system of claim 3, wherein the first aperture is positioned between the discharge chamber and a resonator reflector.

5. A narrow band molecular fluorine laser system, comprising:
    an oscillator, comprising:
        a discharge chamber filled with a laser gas including molecular fluorine and a buffer gas,
        a plurality of electrodes within the discharge chamber connected to a discharge circuit for energizing the laser gas, and
        a resonator including said discharge chamber and for generating a laser beam having a wavelength around 157 nm, a linewidth less than 1 pm, and an energy below a predetermined energy; and
    an amplifier, comprising:
        a gas-filled second discharge chamber at least including molecular fluorine;
        a second plurality of electrodes within the second discharge chamber connected to a same or a different discharge circuit for energizing the gas within the second discharge chamber so that gain is stimulated when the 157 nm beam generated by the oscillator is passed through the energized gas of the amplifier, and
    wherein the laser beam generated by the oscillator and passed through the amplifier has an increased energy so that laser pulses output by the oscillator and passed through the amplifier have an energy that is equal to or above said predetermined pulse energy,
    wherein said buffer gas includes neon for pressurizing the gas mixture sufficiently to increase the output energy for a given input energy, said molecular fluorine being subject to depletion, and wherein said laser system further comprises:
        a gas supply system transferring molecular fluorine into said discharge chamber and thereby replenishing said molecular fluorine in the discharge chamber; and
        a processor cooperating with the gas supply system to control the molecular fluorine concentration within the discharge chamber to maintain said molecular fluorine concentration within a predetermined range of optimum performance of the $F_2$-laser.

6. A narrow band molecular fluorine laser system, comprising:
    an oscillator, comprising:
        a discharge chamber filled with a laser gas including molecular fluorine and a buffer gas,
        a plurality of electrodes within the discharge chamber connected to a discharge circuit for energizing the laser gas, and
        a resonator including said discharge chamber and for generating a laser beam having a wavelength around 157 nm, a linewidth less than 1 pm, and an energy below a predetermined energy; and an amplifier, comprising:
  a gas-filled second discharge chamber at least including molecular fluorine;
  a second plurality of electrodes within the second discharge chamber connected to a same or a different discharge circuit for energizing the gas within the second discharge chamber so that gain is stimulated when the 157 nm beam generated by the oscillator is passed through the energized gas of the amplifier, and wherein the laser beam generated by the oscillator and passed through the amplifier has an increased energy so that laser pulses output by the oscillator and passed through the amplifier have an energy that is equal to or above said predetermined pulse energy, wherein said buffer gas includes neon for pressurizing the gas mixture sufficiently to increase the energy stability of the laser, said molecular fluorine being subject to depletion, and wherein said laser system further comprises:
  a gas supply system transferring molecular fluorine into said discharge chamber and thereby replenishing said molecular fluorine in the discharge chamber; and
  a processor cooperating with the gas supply system to control the molecular fluorine concentration within the discharge chamber to maintain said molecular fluorine concentration within a predetermined range of optimum performance of the $F_2$-laser.

7. A narrow band molecular fluorine laser system, comprising:
  a discharge chamber serving as both an oscillator and an amplifier and being filled with a laser gas including molecular fluorine and a buffer gas;
  a plurality of electrodes within the discharge chamber connected to a discharge circuit for energizing the laser gas;
  a resonator including said discharge chamber for generating a laser beam having a wavelength around 157 nm, a linewidth less than 1 pm, and an energy below a predetermined energy; and
  extra-resonator optics for redirecting the beam generated by and outcoupled from the oscillator back into the discharge chamber, as an amplifier for increasing the energy of the beam, so that laser pulses output by the oscillator and passed through the energized gas within the discharge chamber upon being redirected into the discharge chamber by said extra-resonator optics have an energy that is equal to or above said predetermined energy,
  wherein said extra-resonator optics include an optical delay line for timing the entry of the beam back into the discharge chamber for amplification at or near said time of maximum discharge current.

8. A narrow band molecular fluorine laser system, comprising:
  a discharge chamber serving as both an oscillator and an amplifier and being filled with a laser gas including molecular fluorine and a buffer gas;
  a plurality of electrodes within the discharge chamber connected to a discharge circuit for energizing the laser gas;
  a resonator including said discharge chamber for generating a laser beam having a wavelength around 157 nm, a linewidth less than 1 pm, and an energy below a predetermined energy; and
  extra-resonator optics for redirecting the beam generated by and outcoupled from the oscillator back into the discharge chamber, as an amplifier for increasing the energy of the beam, so that laser pulses output by the oscillator and passed through the energized gas within the discharge chamber upon being redirected into the discharge chamber by said extra-resonator optics have an energy that is equal to or above said predetermined energy,
  wherein said extra-resonator optics include a beam expander for expanding the beam prior to re-entry into the discharge chamber to enhance the amplification of the amplifier.

* * * * *